US009003427B2

(12) United States Patent
Holland et al.

(10) Patent No.: US 9,003,427 B2
(45) Date of Patent: Apr. 7, 2015

(54) METHODS FOR MANAGING AUTHORITY DESIGNATION OF GRAPHICAL USER INTERFACES (71) Applicant: Apple Inc., Cupertino, CA (US)

(72) Inventors: Philip J. Holland, Ypsilanti, MI (US); Ivan Krstic, Sunnyvale, CA (US); Pierre-Oliver J. Martel, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/273,309

(22) Filed: May 8, 2014

(65) Prior Publication Data
US 2014/0310781 A1 Oct. 16, 2014

Related U.S. Application Data (63) Continuation of application No. 13/748,145, filed on Jan. 23, 2013, now Pat. No. 8,752,070, which is a continuation of application No. 13/007,480, filed on Jan. 14, 2011, now Pat. No. 8,365,192.

(51) Int. Cl.
*G06F 13/00* (2006.01)
*H04L 29/06* (2006.01)
*G06F 3/0481* (2013.01)

(52) U.S. Cl.
CPC .............. *H04L 63/10* (2013.01); *G06F 3/0481* (2013.01)

(58) Field of Classification Search
CPC .................................... G06F 9/54; G06F 9/546
USPC .......................................................... 719/313
See application file for complete search history.

(56) References Cited

U.S. PATENT DOCUMENTS

| | | | |
|---|---|---|---|
| 6,044,367 | A | 3/2000 | Wolff |
| 6,535,867 | B1 | 3/2003 | Waters |
| 6,691,113 | B1 | 2/2004 | Harrison et al. |
| 7,587,426 | B2 | 9/2009 | Fujiwara |
| 7,761,706 | B2 | 7/2010 | Lambert |
| 7,770,174 | B1 | 8/2010 | Martin et al. |
| 8,006,196 | B2 | 8/2011 | Hall |

(Continued)

FOREIGN PATENT DOCUMENTS

EP  0940960 A1  9/1999

OTHER PUBLICATIONS

Yee, Ka-Ping "Secure Interaction Design and the Principle of Least Authority", CHI 2003, Fort Lauderdale, FL, Apr. 5-10, 2003, 4 pages.

(Continued)

*Primary Examiner* — Andy Ho
(74) *Attorney, Agent, or Firm* — Blakely, Sokoloff, Taylor & Zafman LLP (57) ABSTRACT According to one aspect, a graphics management system receives a first message from a first process for granting one or more rights to a second process for accessing a GUI element owned by the first process. In response, the graphics management system transmits a second message to the second process, the second message offering the one or more rights to the second process. The graphics management system receives a third message from the second process indicating an acceptance of the offer. Thereafter, the graphics management system restricts access of the GUI element by the second process based on the one or more rights accepted by the second process.

30 Claims, 6 Drawing Sheets

(56) References Cited

U.S. PATENT DOCUMENTS

| | | |
|---|---|---|
| 2004/0133777 A1 | 7/2004 | Kirlansky et al. |
| 2005/0149726 A1 | 7/2005 | Joshi et al. |
| 2006/0021029 A1 | 1/2006 | Brickell et al. |
| 2006/0075464 A1 | 4/2006 | Golan et al. |
| 2007/0136279 A1 | 6/2007 | Zhou |
| 2008/0127292 A1 | 5/2008 | Cooper et al. |
| 2008/0184336 A1 | 7/2008 | Sarukkai |
| 2009/0150546 A1 | 6/2009 | Ryan |
| 2010/0312749 A1 | 12/2010 | Brahmadesam |
| 2010/0312966 A1 | 12/2010 | De Atley et al. |
| 2011/0138174 A1 | 6/2011 | Aciicmez et al. |

OTHER PUBLICATIONS

Hubbard, Jordan, "Mac OS X—From the Server Room to Your", Apple Inc., Nov. 7, 2008, 117 pages.

Mazzoleni, P., et al., "XACML Policy Integration Algorithms (Not to be confused with XACML Policy Combination Algorithms!)", SACMAT '06, Lake Tahoe, CA, Jun. 7-9, 2006, 9 pages.

METHODS FOR MANAGING AUTHORITY DESIGNATION OF GRAPHICAL USER INTERFACES

This application is a continuation of co-pending U.S. patent application Ser. No. 13/748,145 filed on Jan. 23, 2013, now U.S. Pat. No. 8,752,070, which is a continuation of U.S. patent application Ser. No. 13/007,480 filed on Jan. 14, 2011, now issued as U.S. Pat. No. 8,365,192.

FIELD OF THE INVENTION

Embodiments of the invention relate generally to the field of secure computing; and more particularly, to managing access of graphical user interface (GUI) elements.

BACKGROUND

Security concerns for all types of processor-based electronic devices, and particularly for computing devices, have become significant. While some concerns may relate to detrimental actions which may be undertaken by defective code implemented by such devices, the greater concerns relate to the modifications of various types of attacks made upon such devices through malicious code, including code conventionally known in the field by a number of names, such as "viruses", "worms", "Trojan horses", "spyware", "malware", and others. Many of these attacks are directed at computing devices, such as workstations, servers, desktop computers, notebook and handheld computers, and other similar devices. Many of these computing devices can run one or more application programs which a user may operate to perform a set of desired functions.

A number of methodologies have been used in an attempt to reduce or eliminate both the attacks and influence of malicious or defective code. Generally, these methodologies include detection, prevention, and mitigation. Specifically, these methodologies range from attempts to scan, identify, isolate, and possibly delete malicious code before it is introduced to the system or before it does harm (such as is the objective of anti-virus software, and the like), to restricting or containing the actions which may be taken by processes affected by malicious or defective code.

Most modern computer systems employ operating systems that support GUIs. Central to these operating systems is the use of a low-level application referred to as a "window server." One function of a window server is to receive, annotate and route signals from external devices (e.g., human interface devices such as keyboards, pointer devices and tablets) to the appropriate application (e.g., an audio, video or multimedia application). Typically, the window server manages all windows accessed by programs running within a data processing system, including granting accesses to the programs. As more and more programs are running in the system and more and more GUIs are utilized by the programs, the process for granting and managing the access of GUIs becomes more complicated and inefficient.

SUMMARY OF THE DESCRIPTION

According to one aspect of the invention, a graphics management system receives a first message from a first process for granting one or more rights to a second process for accessing a GUI element owned by the first process. In response, the graphics management system transmits a second message to the second process, the second message offering the one or more rights to the second process. The graphics management system receives a third message from the second process indicating an acceptance of the offer. Thereafter, the graphics management system grants access of the GUI element by the second process based on the one or more rights accepted by the second process. In addition, the graphics management system may restrict access of the GUI element by the first process associated with one or more exclusive rights that have been granted to the second process.

According to another aspect, a first application receives a first message from a second application to request accessing a window created by the first application. The first application transmits a second message to a window server running within a data processing system, where the second message includes one or more rights offered to the second application for accessing the window. The first application receives a third message from the window server indicating one of an acceptance and rejection of the one or more rights by the second application. The one or more rights, when accepted, are used by the window server to restrict the access of the window by the first application and/or second application.

According to a further aspect, a first program transmits a first message to a second program via an inter-process call (IPC) to request accessing at least a portion of a first window hosted by the second program. The first program receives a second message from a window manager running within a data processing system, where the window manager manages windows displayed on a display device of the data processing system. The second message includes one or more access rights of the first window offered by the second program response to the second message, the first program transmits a third message to the window manager including one of an acceptance and rejection of the offer of the one or more access rights. The one or more access rights, when accepted by the first program, are used by the window manager to restrict access of the first window by the first program and/or second program.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a mechanism is employed by a window server to allow a first process (e.g., trusted process) as an owner of a window to grant one or more access rights (also simply referred to as rights) of the window to a second process (e.g., untrusted process) as a grantee that requests to access the window. The window server operates as a mediator to allow the first process and second process to negotiate the access rights to allow the second process to access a window owned, possessed, or created by the first process. Once the access rights have been negotiated between the first and second processes, the window server also operates as an enforcer to enforce the agreed upon access rights, which may limit access of the first process and/or second process to the window based on the negotiated access rights.

As a result, by delegating the granting authority to a process that owns the window, the window server does not have handle the specific details of granting the access on behalf of an owner, where the own is in a better position and knows the specific details of the window. In addition, the first process may trust the window server, as the window server may be part of an operating system while the first process may be a certified application. However, the first process may not trust the second process, where the second process may be a third-party application installed in the system. By invoking the window server to mediate the granting of the access rights and to enforce the access rights, the security concerns between the first and second processes have been greatly reduced.

Figure 1:
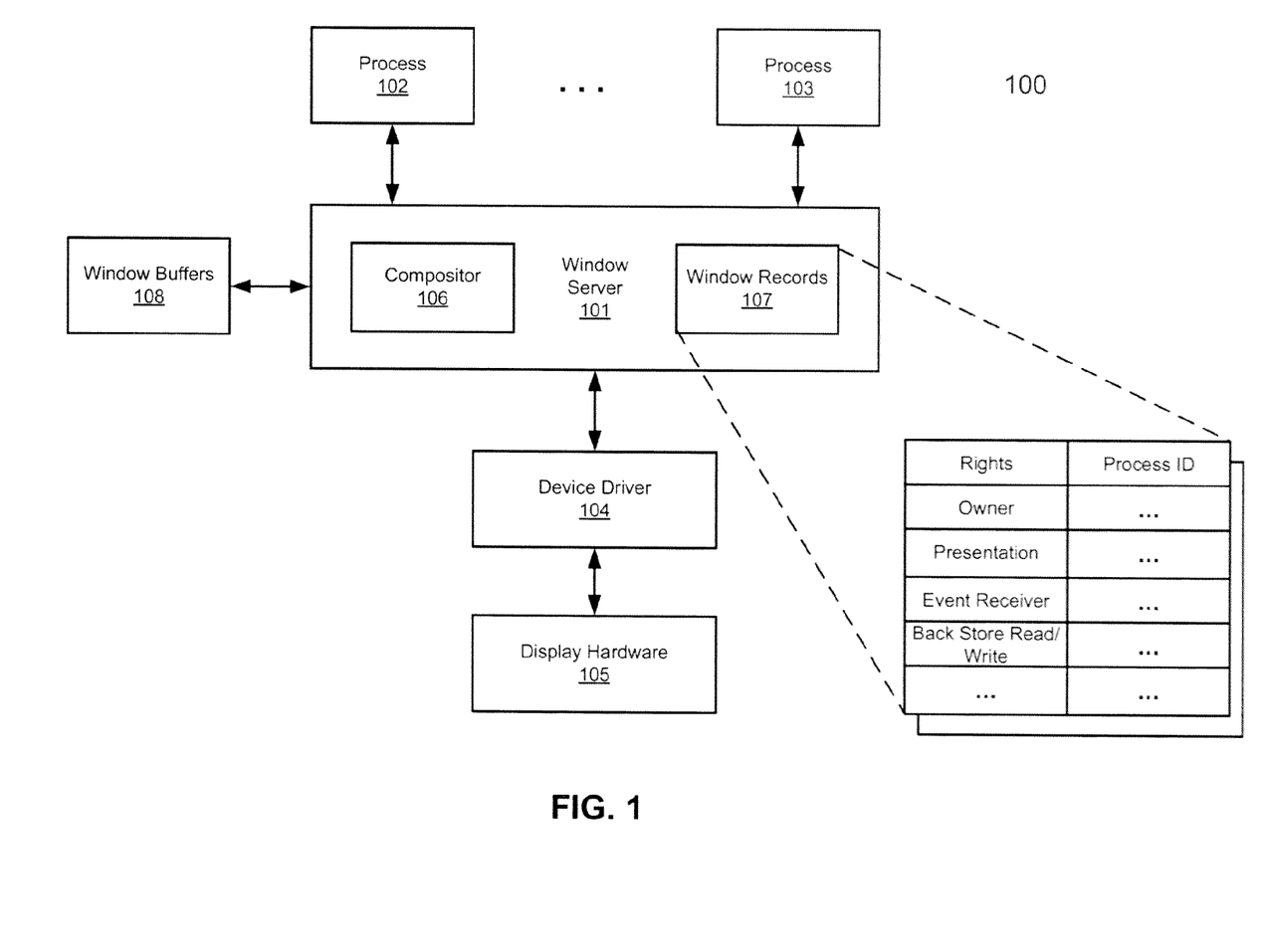
FIG. 1 is a block diagram illustrating system architecture according to one embodiment of the invention.

FIG. 1 is a block diagram illustrating system architecture according to one embodiment of the invention. Referring to FIG. 1, system 100 may represent any computing device such as a desktop, laptop, mobile phone, personal digital assistant (PDA), or a gaming device, etc. In one embodiment, system 100 includes, but is not limited to, one or more processes 102-103 communicatively coupled to window server 101 to render or display a window or GUI element on a display device via device driver 104 and display hardware 105. Processes 102-103 may represent any application or program that is executed by a processor (e.g., a microprocessor) in a memory (e.g., random access memory or RAM). Processes 102-103 may be executed in a user space or a kernel space of an operating system (OS), which may be any kind of operating systems, such as a Mac OS™ available from Apple Inc. of Cupertino, Calif., a Windows™ operating system available from Microsoft Corporation of Redmond, Wash., or other operating systems such as LINUX or UNIX, etc.

Window server 101 (also referred to as a window manager, window management system, or a graphics management system) is system software (e.g., a system component of an operating system) controls the placement and appearance of windows (also referred to as graphical user interface elements) within a windowing system. Window server 101 is designed to help provide an operating environment and it works in conjunction with the underlying graphical system (e.g., display device driver 104 and display hardware 105) which provides required functionality such as support for graphics hardware, pointing devices, and a keyboard. Typically, window server 101 controls access by the operating system and other applications (e.g., processes 102-103) to a display via device driver 104 and display hardware 105 (e.g., a display controller and/or frame buffers). For example, drawing may be clipped to an application's visible window. Window server 101 presents an interface to each client application that enables each client application to run without direct interaction with other applications on the machine.

In one embodiment, the window system as shown in FIG. 1 may be a buffered window system. In a buffered window system, application programs (e.g., processes 102-103) do not draw directly into a video memory, but to off-screen window buffers 108 in system memory that are then composed together by compositor 106 of window server to render the final screen. That is, instead of outputting directly to a common screen, application programs each output data first to a separate and independent window buffer (e.g., window buffers 108), where the data can be manipulated before they are transferred to a frame buffer (not shown) to be shown on a screen of a display device. The output from these separate window buffers is then processed and combined in the frame buffer to display onto a common screen of the display device.

A frame buffer is typically under control of graphics hardware 105 (e.g., a display controller) which controls the display of the windows on the screen of the display device using the data in the frame buffer. Thus, in a buffered window system, operations for creating the content in windows are separated from operations for composing a screen image from images of windows for different applications. Applications 102-103 create (or update) images of the windows content for the windows) in window buffers 108; and compositor 106 of window server 101 composes a screen image from images of the windows in window buffers 108. Window buffers 108 are independent from the frame buffer. Content in the corresponding window buffers 108 can be copied by window server 101 and/or display device driver 104 to the corresponding locations in the frame buffer to display the windows in these locations on the common screen of the display device. The window buffers 108 are independent from the frame buffer.

According to one embodiment, a mechanism is employed by window server 101 to allow a first process (e.g., process 102) as an owner of a window to grant or assign one or more access rights of the window to a second process (e.g., process 103) as a grantee or assignee that requests to access the window. Typically, the second process does not have privilege to access a window and the second process has to rely on the first process to obtain the access rights to the window owned by the first process. For example, the first process may be a trusted process that is responsible for display a dialog box to allow a user to select a file from a file system. The second process may be a network related application that only has privilege to access a network, but it does not have privilege to access the tile system. However, the first process may not trust the second process for the purpose of granting one or more access rights to a window owned by the first process. In this situation, the first process can only trust the window server.

In one embodiment, window server 101 operates as a mediator or bridge to allow the first process and second process to negotiate the access rights to allow the second process to access a window owned by the first process. Once the access rights have been negotiated between the first and second processes, window server 101 also operates as an enforcer to enforce the agreed upon access rights, which may limit access of the second process to the window based on the negotiated access rights.

According to one embodiment, for each window created by a process, window server 101 creates and maintains a window record as part of window records 107. A window record includes detailed information concerning the respective window, including certain access rights that are currently assigned to certain processes. Some of the accesses rights may be exclusive rights (e.g., owner, event receiver, presentation rights) which can only be assigned to a single process at a given time. Other accesses rights (e.g., back store rights) may be non-exclusive rights that can be substantially concurrently assigned to multiple processes. Window server 101 is configured to "oversee" the granting of the access rights from one process to another process or processes. For example, window server 101 may reject granting of any exclusive access rights to multiple processes.

In addition, when a first process attempts to grant an access right to a second process, window server 101 may also authenticate the first process to determine whether the first process has the authority to grant the access right. In one embodiment, only an owner of a window can grant an access right to another process that is not an owner of the window. In this example, if the second process obtains an access right from the first process and the second process attempts to grant the same access right to a third process, window server 101 may reject such an attempt. In one embodiment, window server 101 may maintain a list of ownerships of all windows managed by window server 101. Such information can be used to determine the ownership of a particular window, which can be used to whether a particular process has the authority to grant or assign an access right to another process.

Once the access rights have been granted and accepted, window server 101 is configured to enforce the access rights of a window according to its associated window record. That is, window server 101 may restrict a particular process to access only a portion of a window or a certain function of the window based on the access rights currently owned by that particular process. For example, if a process obtains an access right of a window to receive a mouse-up event (e.g., releasing a mouse button) without obtaining an access right to receive a mouse-down event (e.g., pressing a mouse button), window server 101 may allow the process to receive a notification when a mouse-up event occurs. However, the process would not receive a notification when a mouse-down event occurs. Thus, the access rights serve as an entitlement to access certain areas or functions of a window and at the same time restrict a process from accessing other areas or functions of the window. This literally put a particular process in a restricted operating environment (e.g., sandbox) enforced by window server 101.

Referring back to FIG. 1, for the purpose of illustration, in response to a request received from process 102 for granting one or more access rights to process 103, window server 101 is configured to authenticate process 102 to ensure that process 102 has the authority to grant an access right. Window server 101 is further configured to examine the access rights to be granted, to create a window record reflecting the current states of the window. In one embodiment, a window record includes information identifying all or most of the access rights and the processes that hold the access rights. Thereafter, window server 101 transmits the information representing the window record to process 103 offering the access rights to be granted by process 102. Based on the information received from window server 101, process 103 can either accept or reject the offer. In one embodiment, process 103 can only accept or reject the entire offer. The offer may expire and become invalid after a predetermined period of time within which an acceptance has not been received by window server 101. Once the offer has been accepted by process 103, window server 101 is configured to enforce the access of the window by process 103 based on the accepted terms specified in the window record. In addition, if one or more exclusive rights have been granted to the process 103, access of process 102 associated with the exclusive rights may also be restricted by window server 101 (since process 102 no longer has those exclusive rights).

As a result, by delegating the granting authority to process 102 that owns the window, window server 101 does not have to handle the specific details of granting the access on behalf of an owner. In this situation, process 102 as an owner is in the best position to grant the access rights as typically the owner knows the specific details of the window. In addition, process 102 may trust window server 101, as window server 101 may be part of an operating system while process 102 may be a certified application. However, process 102 may not trust process 103, where process 103 may be a third-party application installed in system 100. By involving window server 101 to mediate the granting of the access rights and to enforce the access rights, process 102 does not have to worry about the authenticity of process 103.

According to some embodiments, an access right of a window includes one of an ownership right, presentation right, event receiving right, back store read right, back store write right, and some other rights. In one embodiment, an ownership right is an exclusive right, granting the sole ability to destroy the window, create right grants, and currently to change the nature of backing resources (such as the for a of the backing store). All exclusive rights not explicitly held are implicitly held by the owner. A presentation right is an exclusive right, granting the ability to display a window visually as part of a process and manipulate the display characteristics (shape, position on screen, etc.) An event recipient right is an exclusive right, granting the ability to receive user events on the window. Mouse clicks & keyboard events routed to the window go to the holder of an even recipient right. Backing store access rights are both non-exclusive rights, granting the ability to read or write the memory backing the window's content. The ability to overwrite content has security implications as fake content can guide a user to perform actions they otherwise would not, and the ability to inspect content has security implications as it enables gathering of user information which a process would otherwise not have access to.

Figure 2:
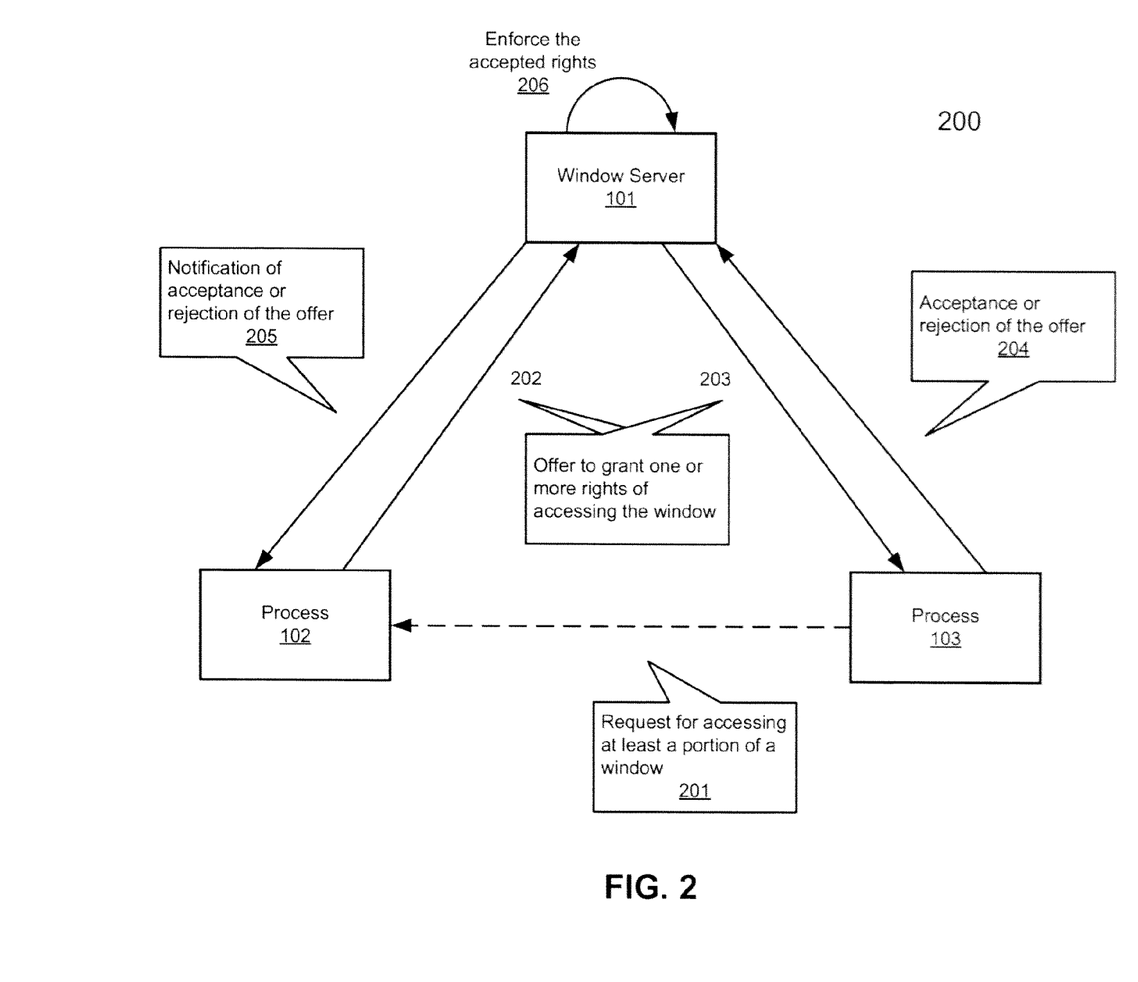
FIG. 2 is a process diagram illustrating a method for granting access rights of a window according to one embodiment of the invention.

FIG. 2 is a process diagram illustrating a method for granting access rights of a window according to one embodiment of the invention. For example, process 200 may be performed by system 100 of FIG. 1. In this embodiment, it is assumed that process 103 does not have privilege to access a window and process 103 has to rely on process 102 to obtain the access rights to the window owned by process 102. For example, process 102 may be a trusted process that is responsible for display a dialog box to allow a user to select a file from a file system. Process 103 may be a network related application that only has privilege to access a network, but process 103 does not have privilege to access the file system. However, process 102 may not trust the process 103 for the purpose of granting one or more access rights to a window owned by process 102. In this situation, process 102 can only trust window server 101. For example, a plug-in may be housed in a separate process, and is unable to access the main window (e.g., the first process not trusting the third party code). A window could be granted to the plug-in which it could, for example, receive events from, and have backing store access, but the host process would keep the ownership and presentation rights so that the experience appeared as if the processes were not separated.

Referring to FIG. 2, initially during transaction 201, when process 103 requests accessing a window owned by process 102, process 103 transmits a first message to process 102, for example, via an inter-process call (IPC) or an application programming interface (API). The request may include information describing the window to be accessed including, for example, a window identifier (ID) identifying the window, a location or coordinates of at least a portion of the window being accessed, and one or ore interactions with the window (e.g., event notifications to be received), etc. In addition, the request may further include a token or process or thread ID that uniquely identifies process 103 under window server 101. For the IPC between two processes prior to contacting the window server, a message or sequence of messages may be communicated between two processes. In one embodiment, a token to be passed to window server 101 to identify process 103 (already in the section), indicating what is being requested. This could be a window identifier, or it could be a description of a behavior/function (e.g., "I want window #213" vs. "I want a save panel"). In addition, a requested set of rights can be optional in this scenario, especially in the case of a description of behavior.

In response to the first message, during transaction 202, process 102 transmits, for example, via an API, a second message to window server 101. The second message includes one or more access rights to be offered to process 102 for accessing the window and a token or process ID associated with process 102. The one or more access rights may represent at least some of the interactions that process 103 can or cannot do with respect to the window. For example, an access right may determine whether a notification of a particular ever (e.g., mouse-up or mouse-down event) will be sent and received by process 103. Some of these access rights may be exclusive rights that can only be possessed or held by a single process at a time or non-exclusive rights that can be shared by multiple processes. In addition, the second message may further include other access rights that are currently held by or assigned to other processes.

In response to the second message received from process 102, window server 101 authenticates process 102 to ensure that process 102 has the authority to grant the rights. In one embodiment, only an owner of a window can grant an access right of the window to another process. Window server 101 also authenticates process 103 based on the token or process ID of process 103. In addition, window server 101 generates a window record corresponding to the window ID obtained from the second message. The window record includes detailed information concerning at least some access rights of the window, including the access rights being offered to process 103. During transaction 203, window server 101 transmits a third message to process 103, where the third message includes at least the one or more access rights being offered. In one embodiment, if some of the access rights being offered include a non-exclusive right, the third message may further identify one or more other processes that share the non-exclusive right. In one embodiment, the third message may further include other access rights held by other processes (but not held by process 103). As a result, process 103 has an entire picture or full description of all the access rights associated with the window in determining whether to accept or reject the offer. In one embodiment, the offer may be good for a predetermined period of time, which may be set up by window server 101 (e.g., via a timer). When there is no acceptance received from process 103, the offer may expire and become invalid.

Based on the offer, during transaction 204, process 103 transmits a fourth message back to window server 101, either accepting the offer or rejecting the offer. During transaction 205, window server 101 transmits fifth message to process 102 indicating whether the offer has been accepted, rejected, or expired. In one embodiment, window server 101 also sets up a timer with a predetermined timeout period and when the timeout period lapses, the offer may become invalid. When the offer has been rejected by process 103 or the offer becomes invalid, the corresponding window record may be updated (e.g., rolled back) or destroyed by window server 101 and without the corresponding window record, window server 101 prevents process 103 from accessing the window.

If the offer has been accepted by process 103, during transaction 206, window sever 101 is configured to enforce the accepted access rights when process 103 accesses the window. For example, process 103 may request to receive certain event notifications (e.g., mouse-up, mouse-down, resize, and/or focus events). Based on the request, process 102 may grant those access rights to receive such event notifications. During operations, when the associated interactions occur on the window, the corresponding event notifications will be transmitted (e.g., via a callback interface) from window server 101 to process 103, provided the corresponding window record indicates that such access rights are currently possessed by process 103. In addition, if an exclusive right has been granted from process 102 to process 103, the access of process 102 associated with the exclusive right may also be restricted by window server 101, as process 102 has given up that exclusive right.

Figure 3:
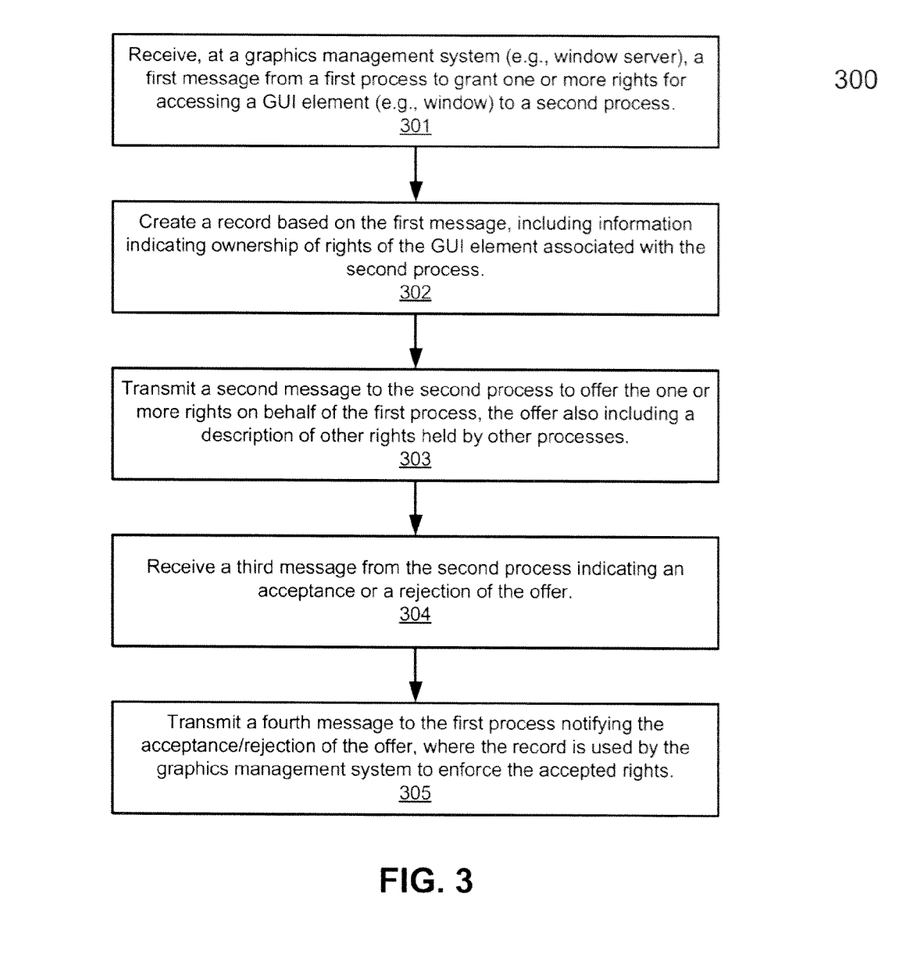
FIG. 3 is a flow diagram illustrating a method for managing access rights of windows according to one embodiment of the invention.

FIG. 3 is a flow diagram illustrating a method for managing access rights of windows according to one embodiment of the invention. For example, method 300 may be performed by window server 101 of FIGS. 1 and 2. Referring to FIG. 3, at block 301, a first message is received at a graphics management system e.g., window server) from a first process to grant one or more rights for accessing a GUI element (e.g., window) to a second process. At block 302, the graphics management system generates a record including information concerning ownership or possession of rights of the GUI element associated with the second process. At block 303, the graphics management system transmits a third message to the second process offering the one or more rights on behalf of the first process. The offer may further include a description of other rights currently held by other processes. At block 304, a third message is received from the second process accepting or rejecting the offer. In one embodiment, the second process can only accept or reject the one or more rights as a whole. Alternatively, the offer may expire and become invalid because no acceptance has been received within a predetermined period of time. At block 305, a fourth message is transmitted from graphics management system to the first process notifying the acceptance or rejection of the offer. When the offer has been accepted, the record is used by graphics management system to enforce the rights granted to the second process when the second process accesses the GUI element. In addition, if an exclusive right has been conveyed from the first process to the second process, access of the first process associated with that exclusive right may also be restricted by the graphics management system.

Figure 4:
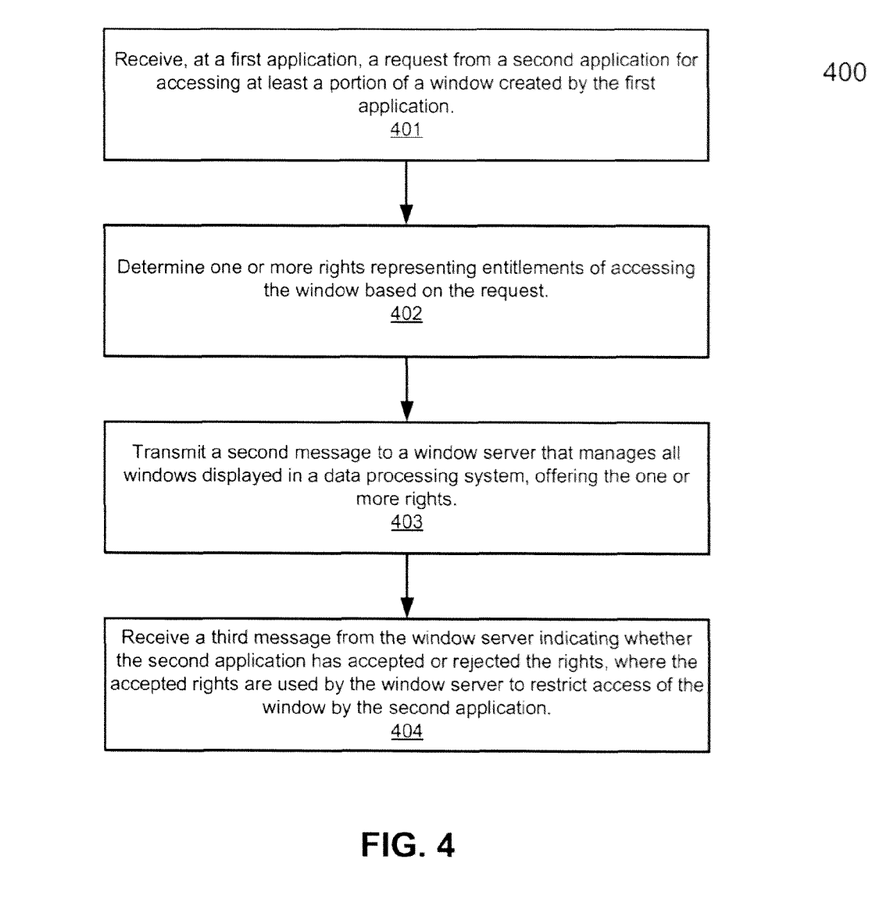
FIG. 4 is a flow diagram illustrating a method for granting access rights of windows according to one embodiment of the invention.

FIG. 4 is a flow diagram illustrating a method for granting access rights of windows according to one embodiment of the invention. For example, method 400 may be performed by process 102 of FIGS. 1 and 2. Referring to FIG. 4, at block

401, a first application receives a request from a second application for accessing at least a portion of a window created or owned by the first application. At block 402, based on the request, the first application determines one or more access rights representing specific entitlements of accessing the window. At block 403, the first application transmits a second message to a window server that manages all windows displayed in a data processing system, offering the one or more rights to be assigned to the second application. At block 404, the first application receives a third message from the window server indicating whether the offer has been accepted or rejected by the second application. One embodiment, the second application can only accept or reject the one or more rights as a whole. Alternatively, the offer may expire and become invalid because no acceptance has been received within a predetermined period of time. The one or more access rights, when accepted by the second application, are used by the window server to restrict access of the window by the second application and/or the first application.

Figure 5:
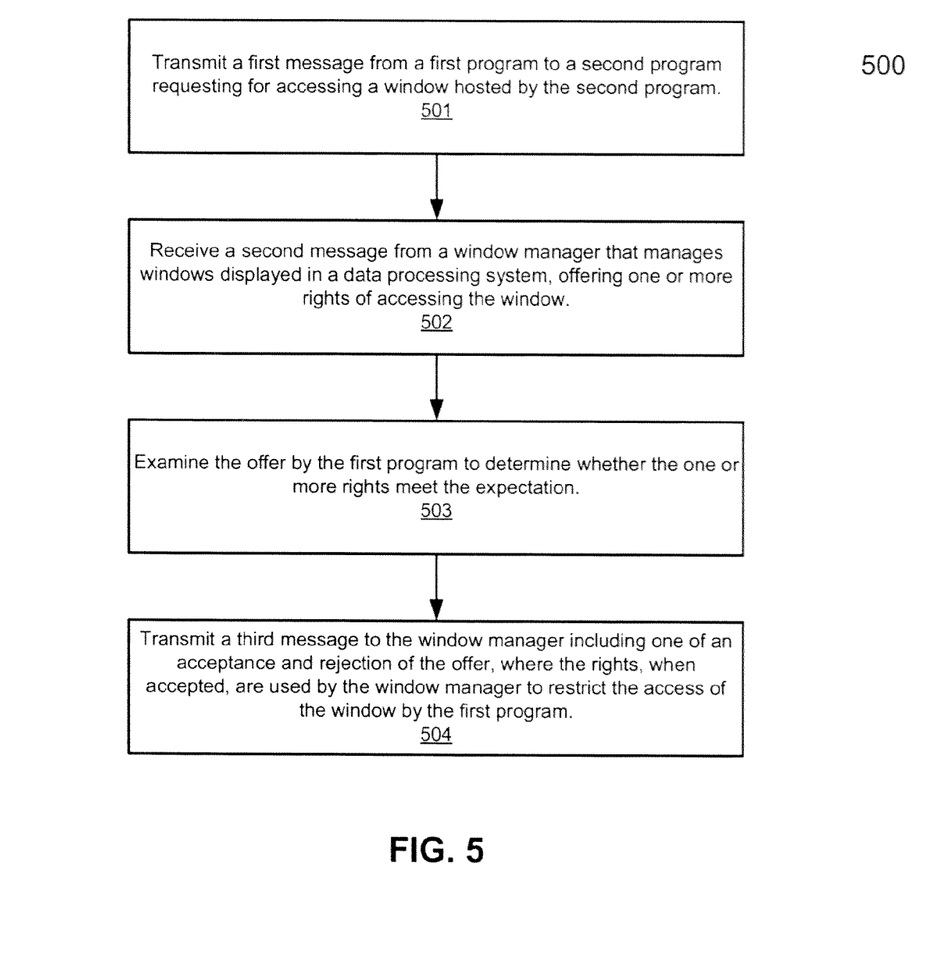
FIG. 5 is a flow diagram illustrating a method for granting access rights of windows according to one embodiment of the invention.

FIG. 5 is a flow diagram illustrating a method for granting access rights of windows according to one embodiment of the invention. For example, method 500 may be performed by process 103 of FIGS. 1 and 2. Referring to FIG. 5, at block 501, a first program transmits a first message to a second program requesting for accessing a window hosted by the second program. At block 502, the first program receives a second message from a window manager that manages windows displayed in a data processing system, the second message offering one or more rights of accessing the window. The second message may further include information describing or identifying other access rights currently held by other programs. At block 503, the first program examines the offer to determine whether the one or more rights meet the expectation. At block 504, the first program transmits a third message to the window manager to accept or reject the offer. In one embodiment, the first program can only accept or reject the one or more rights as a whole. The rights when accepted are used by the window manager to restrict the access of the window by the first program and/or the second program.

Figure 6:
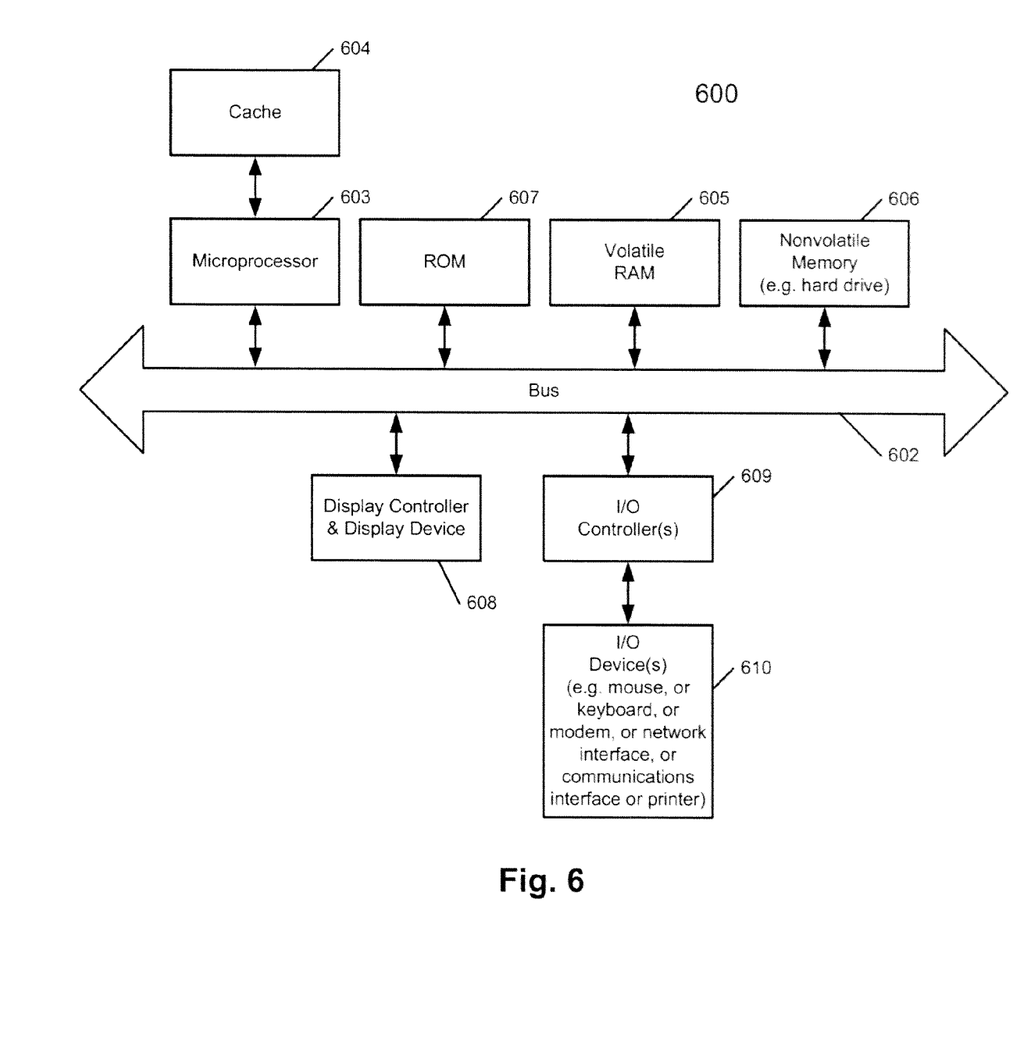
FIG. 6 is a block diagram of a data processing system, which may be used with one embodiment of the invention.

FIG. 6 is a block diagram of a data processing system, which may be used with one embodiment of the invention. For example, the system 600 may be used as system 100 of FIG. 1. Note that while FIG. 6 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 6 may, for example, be an Apple Macintosh computer or MacBook, or an IBM compatible PC.

As shown in FIG. 6, the computer system 600, which is a form of a data processing system, includes a bus or interconnect 602 which is coupled to one or more microprocessors 603 and a ROM 607, a volatile RAM 605, and a non-volatile memory 606. The microprocessor 603 is coupled to cache memory 604. The bus 602 interconnects these various components together and also interconnects these components 603, 607, 605, and 606 to a display controller and display device 608, as well as to input/output (I/O) devices 610, which may be mice, keyboards, modems, network interfaces, printers, and other devices which are well-known in the art.

Typically, the input/output devices 610 are coupled to the system through input/output controllers 609. The volatile RAM 605 is typically implemented as dynamic RAM (DRAM) which requires power continuously in order to refresh or maintain the data in the memory. The non-volatile memory 606 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 6 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 602 may include one or more buses connected to each other through various bridges, controllers, and/or adapters, as is well-known in the art. In one embodiment, the I/O controller 609 includes a USB (Universal Serial Bus) adapter for controlling USB peripherals. Alternatively, I/O controller 609 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the compute system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method implemented within a data processing system, the method comprising:
   receiving, at a server operating as a system component of an operating system, a first message from a first process requesting access to a user interface (UI) element;
   in response to the first message, transmitting a second message from the server to the first process, the second message offering one or more access rights for accessing the UI element that are granted by a second process; and
   restricting, by the server, access of the UI element by the first process based on the one or more access rights accepted by the first process, wherein the server operates as a mediator between the first process and the second process to allow the first process to access the UI element provided by the second process based on the accepted one or more access rights.

2. The method of claim 1, further comprising:
   receiving, at the server, a third message from the first process in response to the second message, the third message including an acceptance of the offer of the one or more access rights; and
   transmitting a fourth message to the second process indicating that the first process has accepted the offer of the one or more access rights, wherein the server allows the first process to access the UI element only if the offer of the one or more access rights has been accepted by the first process.

3. The method of claim 1, further comprising:
   creating in a database associated with the server a record associated with the UI element, the record including information indicating an ownership of the UI element; and
   enforcing, by the server, the one or more access rights for accessing the UI element by the first process based on the record of the UI element.

4. The method of claim 1, further comprising authenticating the second process by the server to determine whether the second process is authorized to grant the one or more access rights.

5. The method of claim 1, wherein the server presents an interface to the first process and the second process to operate and communicate with each other without direct interaction.

6. The method of claim 1, wherein the first process and the second process communicate with each other via an inter-process call (IPC).

7. The method of claim 1, wherein the first process is executed within a restricted operating environment that is configured based in part on the accepted one or more access rights.

8. The method of claim 1, wherein the second process is associated with a third-party application with respect to the operating system.

9. The method of claim 1, wherein the UI element comprises a window displayed on a display of the data processing system by the second process.

10. The method of claim 1, wherein the UI element provides an graphical user interface (GUI) to access a file stored in a file system of the operating system.

11. The method of claim 1, wherein the UI element comprises at least one of a keyboard and a pointing device associated with the data processing system.

12. The method of claim 1, wherein the second process is a plugin to the first process.

13. A non-transitory machine-readable medium having instructions stored therein, which when executed by a data processing system, cause the data processing system to perform a method, the method comprising:
   receiving, at a server operating as a system component of an operating system, a first message from a first process requesting access to a user interface (UI) element;
   in response to the first message, transmitting a second message from the server to the first process, the second message offering one or more access rights for accessing the UI element that are granted by a second process; and
   restricting, by the server, access of the UI element by the first process based on the one or more access rights accepted by the first process, wherein the server operates as a mediator between the first process and the second process to allow the first process to access the UI element provided by the second process based on the accepted one or more access rights.

14. The non-transitory machine-readable medium of claim 13, wherein the method further comprises:
   receiving, at the server, a third message from the first process in response to the second message, the third message including an acceptance of the offer of the one or more access rights; and
   transmitting a fourth message to the second process indicating that the first process has accepted the offer of the one or more access rights, wherein the server allows the first process to access the UI element only if the offer of the one or more access rights has been accepted by the first process.

15. The non-transitory machine-readable medium of claim 13, wherein the method further comprises:
   creating in a database associated with the server a record associated with the UI element, the record including information indicating an ownership of the UI element; and
   enforcing, by the server, the one or more access rights for accessing the UI element by the first process based on the record of the UI element.

16. The non-transitory machine-readable medium of claim 13, wherein the method further comprises authenticating the second process by the server to determine whether the second process is authorized to grant the one or more access rights.

17. The non-transitory machine-readable medium of claim 13, wherein the server presents an interface to the first process and the second process to operate and communicate with each other without direct interaction.

18. The non-transitory machine-readable medium of claim 13, wherein the first process and the second process communicate with each other via an inter-process call (IPC).

19. The non-transitory machine-readable medium of claim 13, wherein the first process is executed within a restricted operating environment that is configured based in part on the accepted one or more access rights.

20. The non-transitory machine-readable medium of claim 13, wherein the second process is associated with a third-party application with respect to the operating system.

21. The non-transitory machine-readable medium of claim 13, wherein the UI element comprises a window displayed on a display of the data processing system by the second process.

22. The non-transitory machine-readable medium of claim 13, wherein the UI element provides an graphical user interface (GUI) to access a file stored in a file system of the operating system.

23. The non-transitory machine-readable medium of claim 13, wherein the UI element comprises at least one of a keyboard and a pointing device associated with the data processing system.

24. The non-transitory machine-readable medium of claim 13, wherein the second process is a plugin to the first process.

25. A data processing system, comprising:
- a processor;
- a memory coupled to the processor; and
- an operating system executed in the memory by the processor, the operating system including a server operating as a system component, the server configured to perform operations including
    - receiving a first message from a first process requesting access to a user interface (UI) element,
    - in response to the first message, transmitting a second message from the server to the first process, the second message offering one or more access rights for accessing the UI element that are granted by a second process, and
    - restricting, by the server, access of the UI element by the first process based on the one or more access rights accepted by the first process, wherein the server operates as a mediator between the first process and the second process to allow the first process to access the UI element provided by the second process based on the accepted one or more access rights.

26. The system of claim 25, wherein the operations further comprise:
- receiving, at the server, a third message from the first process in response to the second message, the third message including an acceptance of the offer of the one or more access rights; and
- transmitting a fourth message to the second process indicating that the first process has accepted the offer of the one or more access rights, wherein the server allows the first process to access the UI element only if the offer of the one or more access rights has been accepted by the first process.

27. The system of claim 25, wherein the operations further comprise:
- creating in a database associated with the server a record associated with the UI element, the record including information indicating an ownership of the UI element; and
- enforcing, by the server, the one or more access rights for accessing the UI element by the first process based on the record of the UI element.

28. The system of claim 25, wherein the operations further comprise authenticating the second process by the server to determine whether the second process is authorized to grant the one or more access rights.

29. The system of claim 25, wherein the server presents an interface to the first process and the second process to operate and communicate with each other without direct interaction.

30. The system of claim 25, wherein the first process and the second process communicate with each other via an interprocess call (IPC).

* * * * *